April 7, 1970             R. N. MITCHELL             3,504,518

METAL CUTTING SYSTEM

Filed April 8, 1968                                         7 Sheets-Sheet 6

FIG. 6

INVENTOR
RANDOLPH N. MITCHELL

BY *Glenn, Palmer & Lyne*
ATTORNEYS

INVENTOR
RANDOLPH N. MITCHELL

BY Glenn, Palmer & Lyne
ATTORNEY

United States Patent Office 3,504,518
Patented Apr. 7, 1970

3,504,518
METAL CUTTING SYSTEM
Randolph N. Mitchell, Richmond, Va., assignor to
Reynolds Metals Company, Richmond, Va., a corporation of Delaware
Continuation-in-part of application Ser. No. 704,929,
Feb. 12, 1968. This application Apr. 8, 1968, Ser.
No. 725,251
Int. Cl. B21d 28/02, 28/06
U.S Cl. 72—331                    19 Claims

ABSTRACT OF THE DISCLOSURE

A system for cutitng continuously moving hot metal strip in which the strip is moved vertically and forwardly wtih respect to its line of travel to a cutting station. Cooperating fixed and movable blades angled at approximately 45° to the line of travel perform the cutting operation.

The ends of the strip cut thereby are provided with a convex V-shape which facilitates entry of the strip into the rolls of a rolling mill. An added feature is that the blades may be actuated continuously to cut up the strip into small pieces when a wreck occurs in the rolling mill.

---

This is a continuation-in-part of my patent application entitled "Metal Cutting System," Ser. No. 704,929, filed Feb. 12, 1968, now abandoned.

This invention pertains to a metal cutting system and more particularly to a system suitable for use in a hot line where metal strip may be cut on a continuous basis by a reciprocating blade action.

Heretofore it has been customary to use a so-called flying shear in order to cut a moving strip of metal. In arrangements of this type a substantial amount of floor space is necessary for the blade mounting in order to effect a shearing action at rapid speeds. In some installations it is not feasible to take the space required in order to utilize a flying shear. Even where space permits, it is not easy to control the flying shear and to obtain the necessary synchronization with the strip required to produce the desired length of metal.

Another type of shear which has been employed utilizes rotating drums with one or more sets of blades mounted thereon. In order to obtain the required mass and stability, these drums must be made very large. By the time the necessary drives and braking systems are developed, this type of shearing becomes very expensive.

According to the present invention, the principal disadvantages of the flying shear and rotating drum cutoffs are effectively overcome in a reciprocating blade arrangement. In the preferred form of the invention, one of the blades is maintained stationary and the other blade is movable. The longitudinal axis of each of the blades is positioned at an angle of approximately 45° to the line of travel of the strip to be cut. Means are provided to move the strip vertically toward the fixed blade and in the direction of the line of travel of the strip. This is achieved by means of a novel lifting table which lifts the strip as it is about to be cut upwardly and forwardly with respect to the direction of the line of travel which in conjunction with the angular positioning of the blades prevents any momentary back tension while cutting the rear portion of the moving strip. To insure that there is no back tension on the moving strip the moving blade has a component along the line of travel equal to or greater than the velocity of the strip. Thus for blades positioned at an angle of approximately 45° to the line of travel, the moving blade will have a minimum linear velocity of approximately √2 times the velocity of the strip so that its component along the line of travel will be at least equal to the velocity of the strip.

The blades impart a convex or V-shaped cut to the ends of the cut strip which improves the bite of the rolls in the rolling mill, reduces rolling shock, minimizes refusals and reduces bite marks on the cut strip.

The leading end of the strip is cut while the strip is not moving, but by the time that the trailing end approaches the cutting station the leading end of the strip is in the rolling mill thereby necessitating cutting the trailing end while the strip is being advanced continuously.

The inherent advantages and improvements of the present invention will become more readily apparent upon considering the following detailed description of the invention and by reference to the drawings in which:

Figure 1:
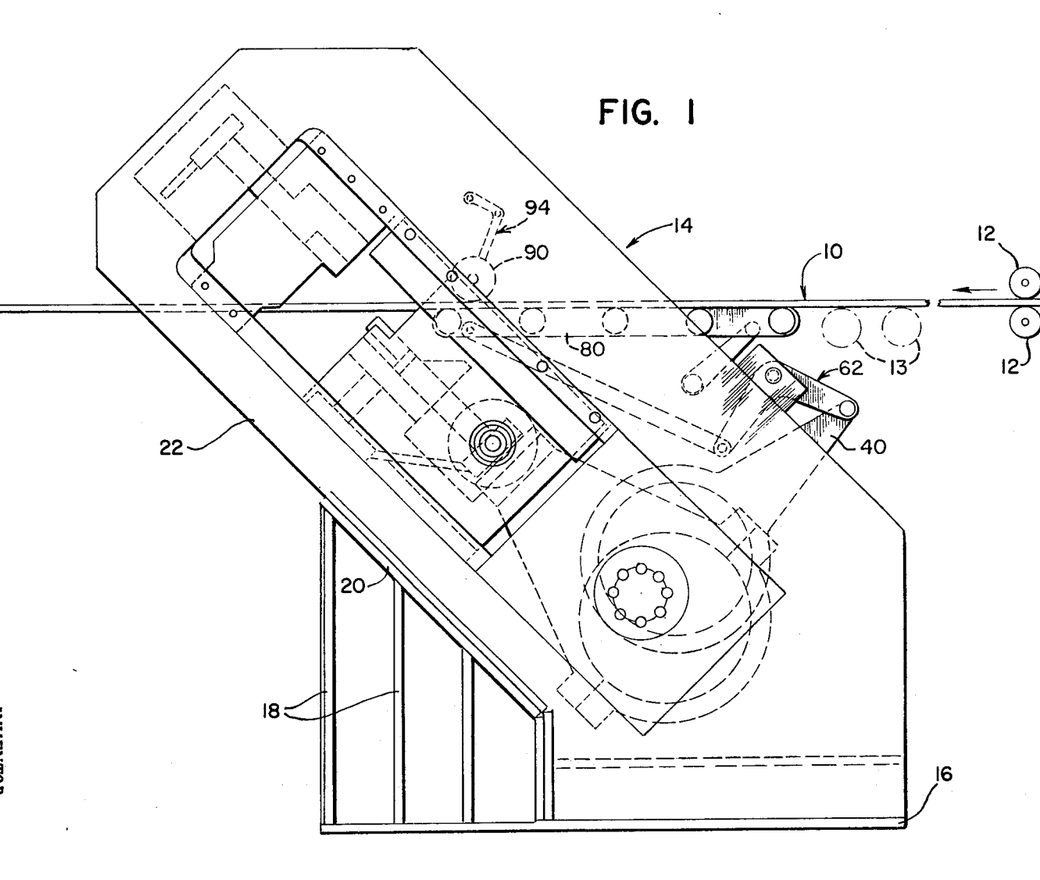
FIG. 1 is a side elevational view illustrating the shearing apparatus of the present invention.

Referring now to FIG. 1, there is illustrated the feeding of a metal strip, indicated generally at 10, by means of a pair of cooperating rolls 12. The metal strip 10 is fed over suitable supporting rolls 13 which may take the form of a conveyor or other horizontal transport device toward a cutting station indicated generally at 14.

The apparatus at the cutting station 14 includes a base 16, vertical support members 18 and a sloping support member 20. A sloping frame member 22 is received in sloping support member 20 and is provided with a guideway 24, seen best in FIGS. 2 through 5. A table carrier 26 slides in guideway 24 and carries a movable blade 28 which is positioned in cutting relationship with respect to a fixed blade 30 carried in a holder 32.

A fixed blade 30 is illustrated to have a double rake with a first appearing at 30a, 30b and a second rake appearing at 30c, 30d. In the preferred form, however, as illustrated schematically in FIG. 9, the blade 30 has a single rake indicated by sloping surfaces 30a and 30b. It will be observed that no rake is shown for the movable blade 28 in order to avoid a back force, that is, in the direction from which the strip is being fed. It is preferred that minimum rake be preserved for the movable blade in order to avoid this backward force.

A main drive shaft is indicated at 34 for supplying the movement to the table carrier 26 in order for it to reciprocate in guideway 24. An input drive pulley 36 is shown affixed to the main drive shaft 34 by being keyed thereto at 38.

A pair of drive collar members 39 are fixedly attached to main drive shaft 34 for rotation therewith. A lever 40 is slidably mounted on each drive collar member 39 in order to drive a strip lifting means to be described hereinafter in greater detail. A pair of eccentrics 42 are mounted on opposite sides of the drive collar members 39. Each eccentric 42 is connected for rotation with one of the drive collar members 39 by means of pins 44 which extend through a respective drive collar member 39 into an adjacent eccentric.

Slidably mounted on each eccentric 42 is a connecting rod 46. Each connecting rod 46 is provided with an end cap member 47 which is bolted to its respective connecting rod in conventional manner. At the end of each connecting rod 46 there is provided an end boss 48 through which extend stub shafts 50 which are in turn bolted to table carrier 26. It will be observed that table carrier 26 is provided with a twin yoke construction each of which surrounds an end boss 48 of a connecting rod 46 in order to support stub shafts 50. Therefore, as the connecting rods 46 are driven by eccentrics 42 directly mounted to main drive shaft 34, a reciprocating motion is imparted to the table carrier 26 which carries movable blade 28.

By virtue of the fact that the movable blade 28 approaches and withdraws from fixed blade 30 at an angle of approximately 45°, an exit throat-like construction is produced when blade 28 withdraws. This is especially beneficial in removing small cut pieces of metal strip 10 when the blades are reciprocated continuously in order to compensate for a week in the rolling mill in a manner to be described hereinafter. This throat-like construction is indicated by the dashed line in FIG. 4.

Figure 2:
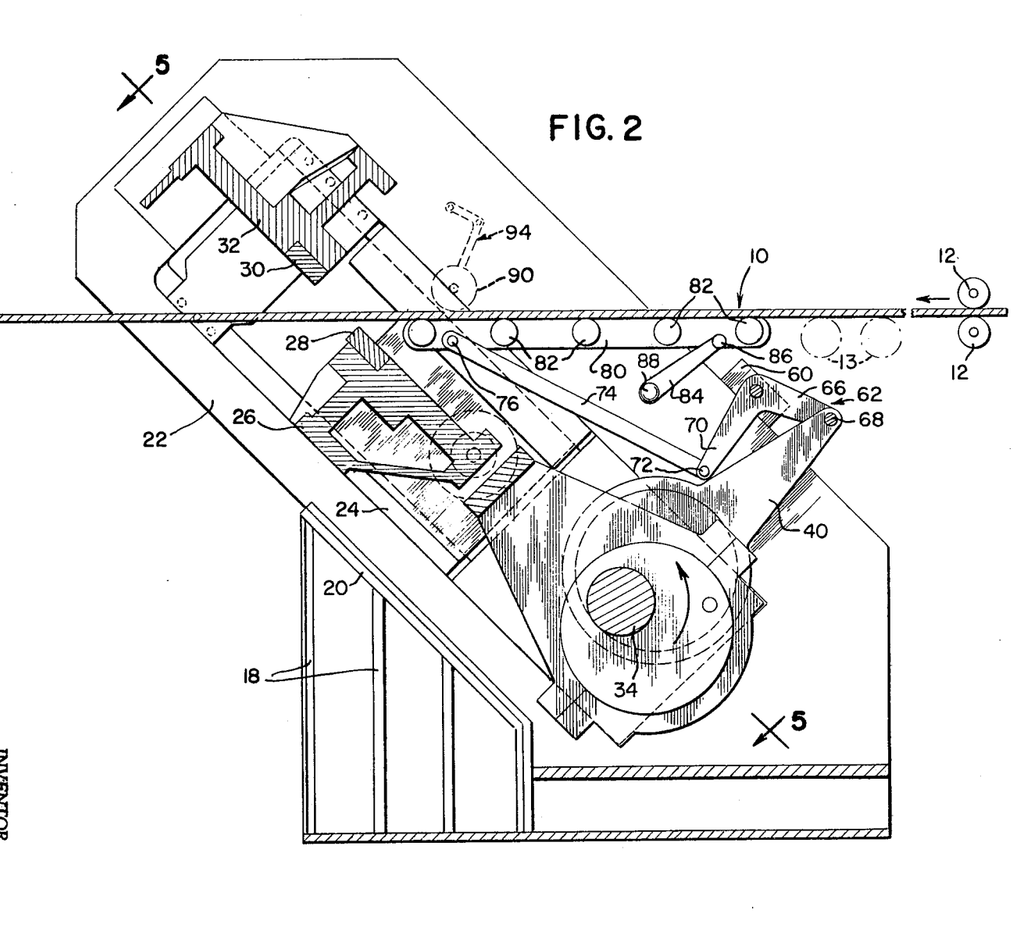
FIG. 2 is a side elevational view similar to FIG. 1, partially in cross section, illustrating the lift table of the present invention.
Figure 3:
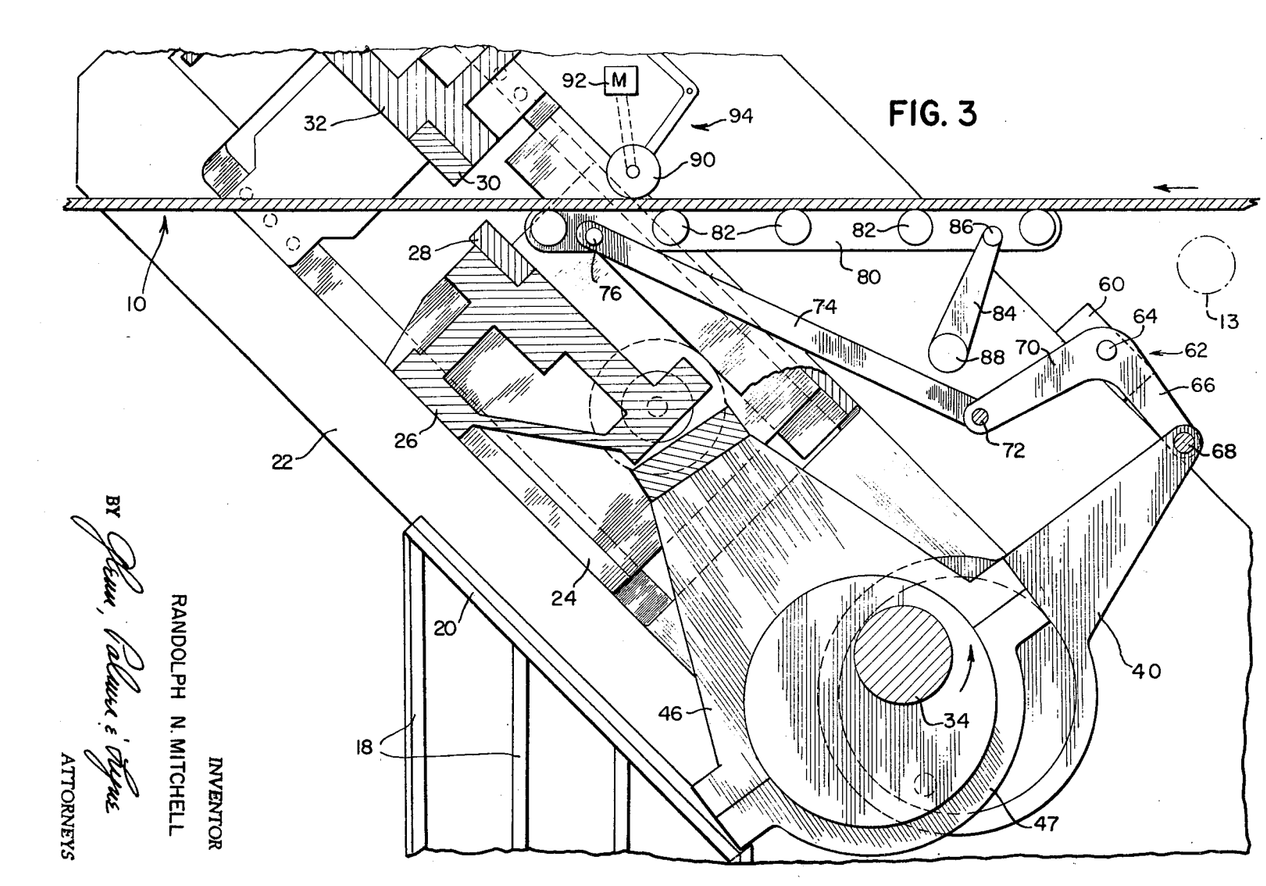
FIG. 3 is a cross-sectional view in side elevation, drawn to a larger scale, illustrating a different position for the shearing apparatus and lifting table.
Figure 4:
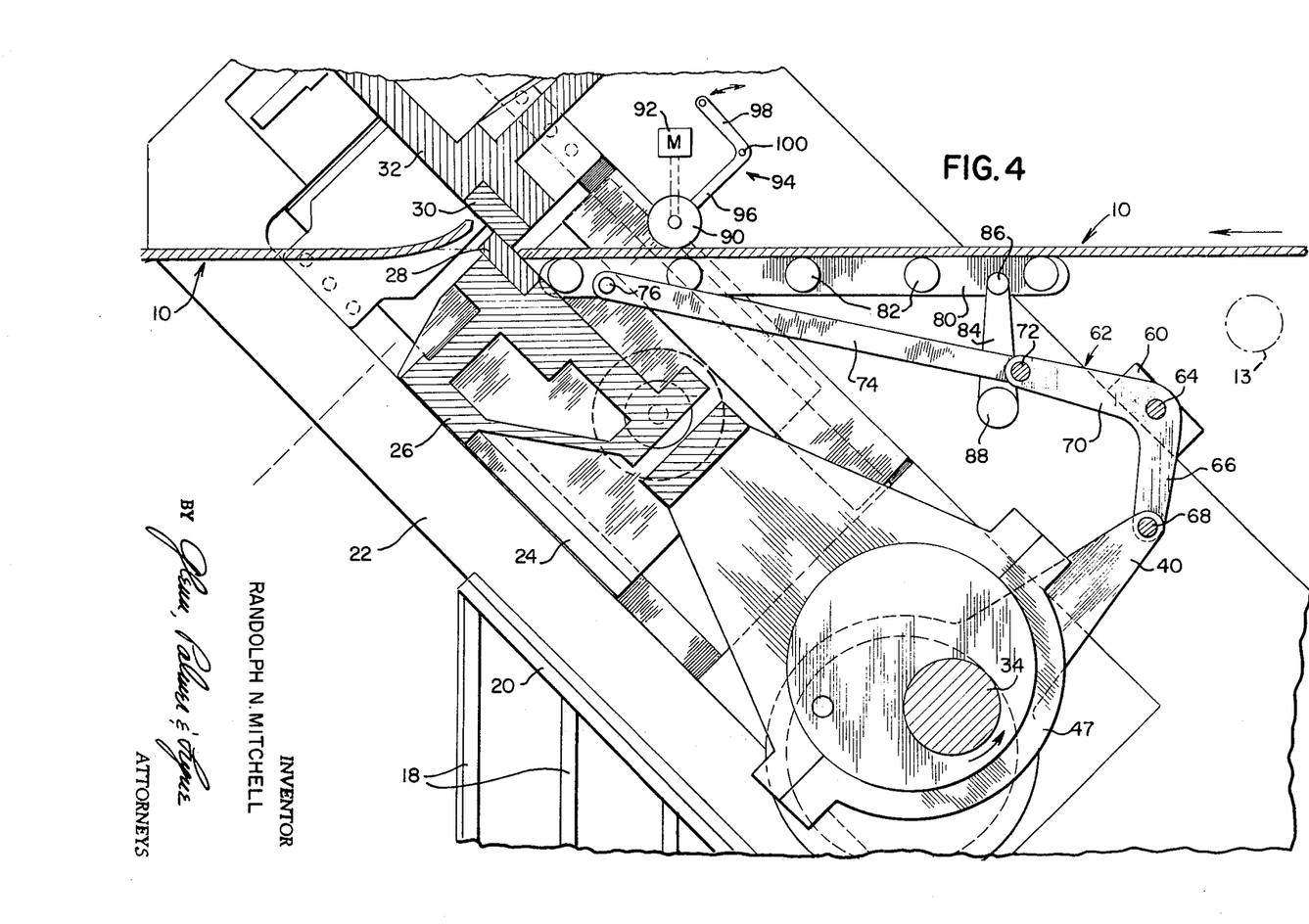
FIG. 4 is a cross-sectional view in side elevation similar to FIG. 3 illustrating the shearing apparatus immediately following the completion of a shearing operation.
Figure 5:
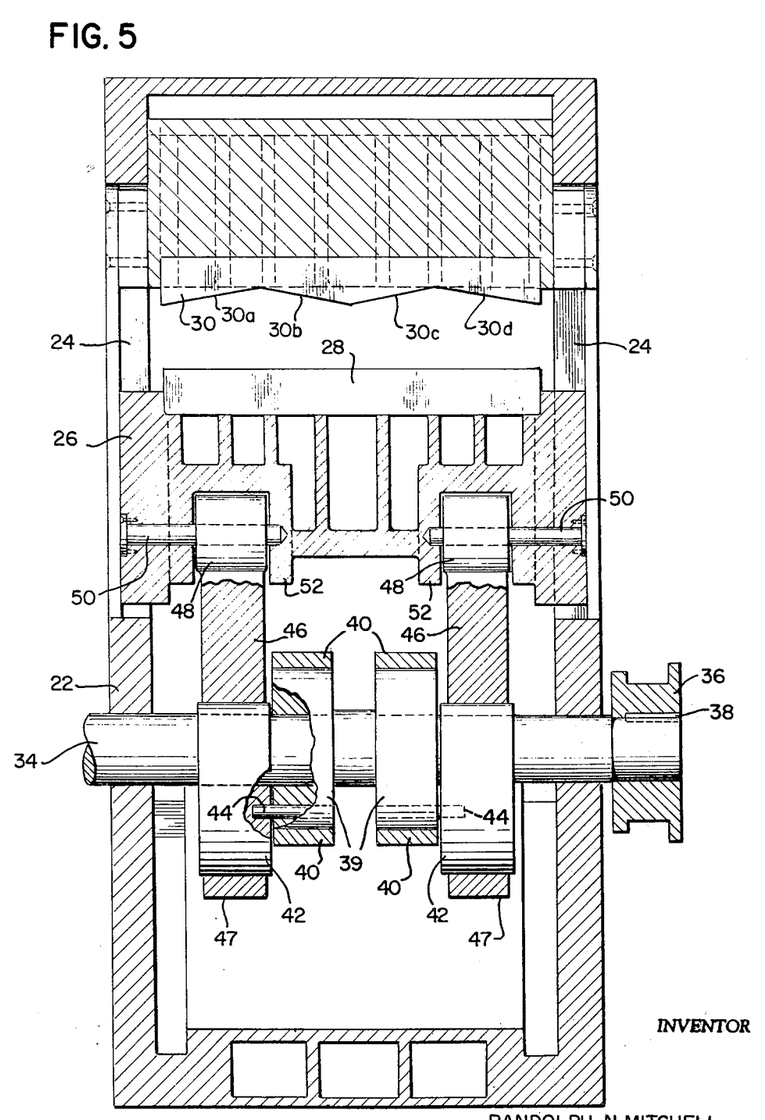
FIG. 5 is a cross-sectional view in side elevtaion taken along line 5—5 of FIG. 2.

Each lever 40 is connected to a linkage such as is shown in FIGS. 2, 3 and 4 for lifting the metal strip 10 upwardly and forwardly with respect to its line of travel into closer proximity to the fixed blade 30. Thus each lever 40 is connected to a bell crank 62 which is mounted to a portion of frame 60 for oscillation about its pivot point 64. The bell crank 62 has a first leg 66 which is pinned at 68 to the free end of lever 40 and a second leg 70 which is pinned at 72 to a connecting link 74. The other end of connecting link 74 is pinned at 76 to a lifting table 80. The lifting table 80 is provided with a plurality of rods 82 which engage and lift the strip 10 from its vertical supports 13 such as is illustrated in FIGS. 3 and 4. A further link 84 pinned to table 80 at 86 is pivoted at 88 to the frame member. The various positions of the kinematic linkage are illustrated in FIGS. 2, 3 and 4, commencing with fully retracted position for table 80 in FIG. 2 an intermediate position for table 80 in FIG. 3, and the fully raised position for table 80 in FIG. 4. Concurrently, it will be observed that the movable knife 28 supported on table carrier 26 is advanced with the rise in table 80 and continues to advance even after the table 80 has reached its maximum upward position. In this manner, the strip 10 is elevated prior to the advance of the movable blade 28 so that the movable blade does not contact, scrape and score the underside of the metal strip 10 in the course of its advance. That is to say, the movable blade 28 meshes with fixed blade 30 only after the table 80 has stopped its upward advance.

A driven feed roller 90 driven by motor 92 is used to engage and feed the metal strip 10 in order to cut the metal strip 10 continuously for a purpose to be described hereinafter. The feed roller 90 is illustrated to be attached to a bell crank lever 94 in FIG. 4 which has a pair of legs 96 and 98 which pivot at 100 with respect to the frame. Suitable and conventional means, not shown, are used to bring the feed roller 90 into feeding position.

Figure 6:
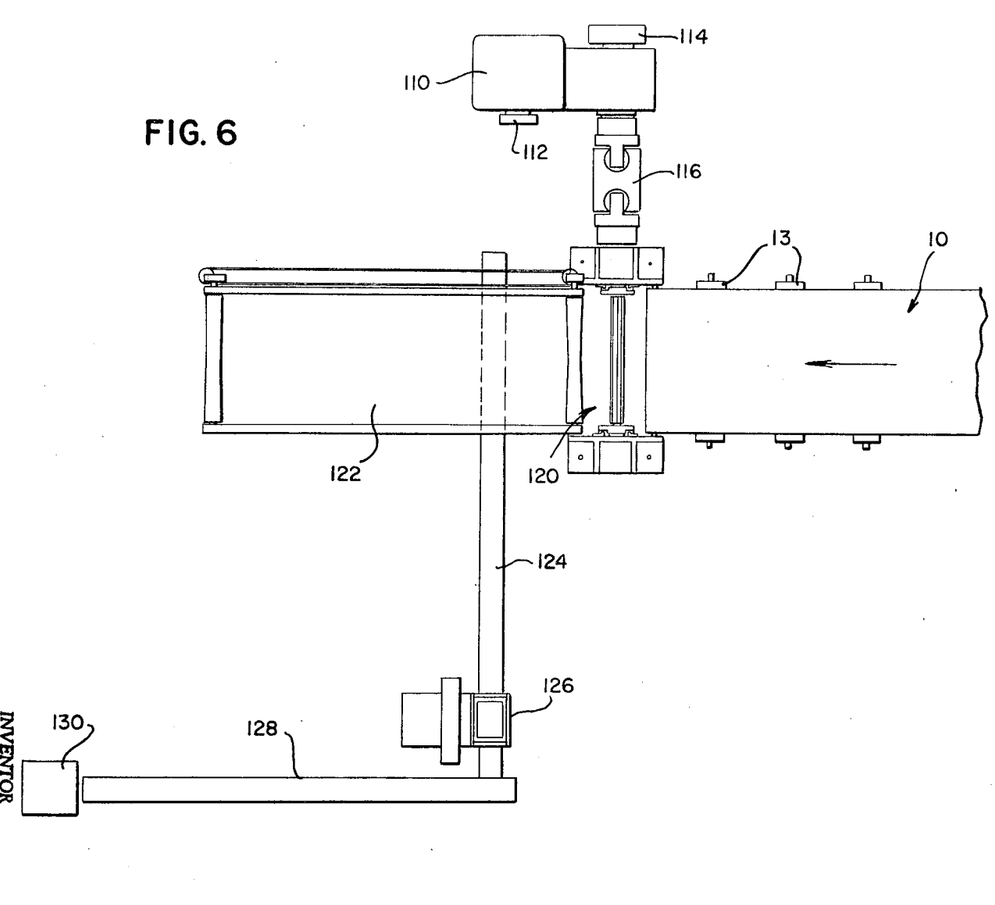
FIG. 6 is a plan view of one form of arrangement for auxiliary apparatus to be used with the shearing apparatus of the present invention.

Referring now to FIG. 6 there is illustrated a schematic general layout and some auxiliary apparatus which may be used in connection with the present invention. A motor drive is provided at 110 with a suitable braking means indicated at 112. A clutch is provided at 114 which is a single revolution clutch but which may be overridden so as to be energized continuously when desired. A suitable coupling means 116 carries the output drive to the cutting station indicated schematically at 120 in FIG. 6.

A shear delivery table is illustrated at 122 with a scrap conveyor 124 arranged at right angles to the line of feed so as to transport scrap material to a scrap chopper indicated schematically at 126. Thereafter, a scrap conveyor 128 carries the chopped-up scrap to a scrap bucket or pit 130.

Figure 7:
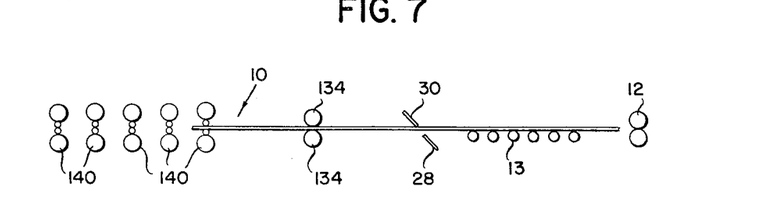
FIG. 7 is a schematic view illustrating the feeding, shearing, trimming and rolling operations performed in the present invention.
Figure 8:
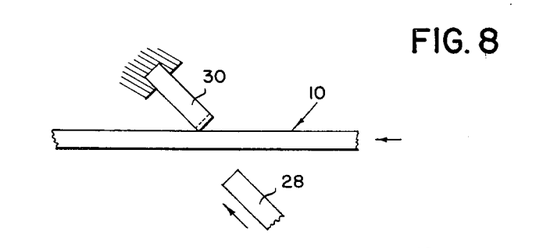
FIG. 8 is a schematic view illustrating the action of the shearing blades.

The general arrangement is further illustrated in FIG. 7 wherein the metal strip means 10 is fed by feed rollers 12 over suitable vertical support members 13 which may take the form of rollers and/or conveyors toward the cutting station 14. After the strip 10 is cut by the co-action of movable blade 28 with fixed blade 30, it passes to tandem hot strip mill 140. Enroute to the hot strip mill 140 the metal strip 10 passes through a rotary side trimmer station 134 which is conventional for purposes of this invention and which effectively amounts to another stand in the rolling mill.

Whenever a wreck occurs in the strip mill 140 it is desired to run the shearing station continuously so as to cut up the advancing strip 10 so that the metal can be continuously fed from feed rollers 12. When such a wreck occurs in the tandem hot strip mill 140 it is necessary to have the auxiliary feed means 90 come into play since the strip mill is no longer available to pull the cut metal after it has passed the cutting station 14. Therefore, the single revolution clutch 114 is overridden so as to be energized continuously, and the shaft 34 is driven continuously thereby reciprocating movable blade 28 into engagement with the fixed blade 30 on a continuous basis. The metal then falls from the natural trough provided by the angled cooperation of blades 28 and 30 onto a suitable table such as illustrated at 122, and removed by means of scrap conveyor 124 to scrap 126 after which it is removed to a scrap bucket 130 by means of scrap conveyor 128. This is considered to be an important feature of this invention wherein the shearing operation may be performed continuously.

Figure 9:
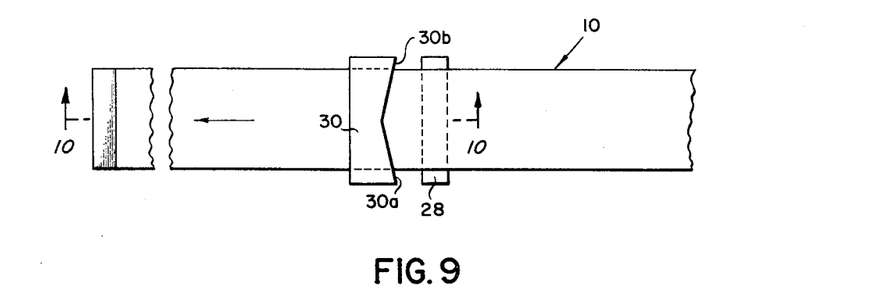
FIG. 9 is a schematic plan view of the cutting blades of FIG. 8.

Reference to FIGS. 8 through 11 illustrates the invention in schematic form wherein the movable blade 28 is shown advancing on fixed blade 30 with the metal strip 10 being fed therethrough. The rake on the preferred form of fixed blade 30 is shown in FIG. 9 in somewhat exaggerated form.

Figure 10:
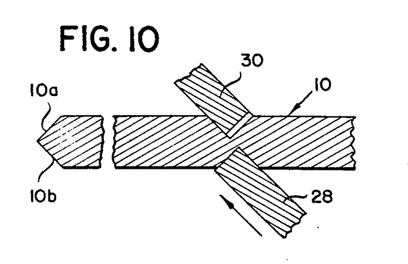
FIG. 10 is a cross-sectional view drawn to an enlarged scale taken along line 10—10 of FIG. 9.
Figure 11:
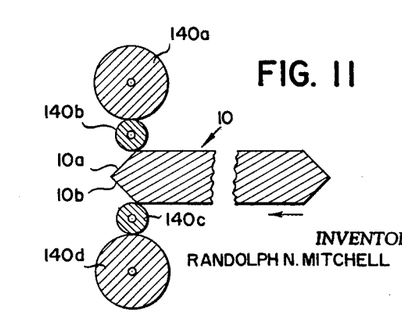
FIG. 11 is a cross-sectional view illustrating the entrance of the metal strip into the rolling mill.

A further important feature of this invention is the provision of the convex or V-shaped contour imparted to the cut metal such as is illustrated at 10a and 10b in FIGS. 10 and 11. As best illustrated in FIG. 11, the V-shaped or convex configuration imparted to the end of the cut metal strip 10 facilitates its introduction to the rolling mill at 140b and 140c, rolls 140a and 140d being back-up rolls for the smaller rolls of the strip mill. This construction also serves to improve the bite on the strip to reduce the bite marks and also to permit belt wrapping of slightly heavier gauges of metal.

With this invention, the tail end of the strip is sheared symmetrically which prevents slashing around of the end in the rolling mill. Thus there is no problem with rolling in the harder alloys of aluminum such as the high copper alloys in the 2000 series, the high magnesium alloys in the 5000 series and the high zinc alloys in the 7000 series as designated by the Aluminum Association.

In operation, it is preferred to make a V-shaped cut on the leading edge of strip 10 by coaction of blades 28 and 30 while the strip 10 is at rest. Thereafter, the edges of the strip 10 are trimmed at rotary side trimmer station 134 and passed into the tandem hot strip mill 140. The strip is being fed forward continuously as depicted in FIG. 7 under the influence of the hot strip mill 140 when the trailing end of the strip 10 reaches blades 28 and 30. The mass of the tail end is not great enough to damage the blades 28 and 30 with the former having a component of motion along the line of travel at least equal to the velocity of the moving strip so that at a position 45° to the line of travel the minimum linear velocity of the moving blade 28 will be $\sqrt{2}$ times the velocity of the moving strip 10.

As a specific example, the vertical space between blades 28 and 30 is in the order of two to two and one-half inches so as to accommodate comfortably a strip 10 having a thickness of one and one-half inches or less. A typical width of strip is 80 inches for which blades 28 and 30 may be 120 inches wide. These examples are, of course, not limiting but given for illustrative purposes only. For strips 10 not over one and one-half inches thick, the conditions known as "fish mouthing" and "alligatoring" are not serious problems.

It will be apparent that the space required for the reciprocating blade action of the present invention can be accomplished in considerably less floor space than is required in either of the flying shear type of shear or the rotary drum shears.

The type of shearing system disclosed herein can be installed for a cost considerably less than either of the two cutting systems discussed above.

The invention has been described with respect to a movable blade which moves upwardly and forwardly with respect to the direction of travel of the metal strip but it is also applicable to a downward cut, that is, wherein the movable blade is mounted above the moving strip and a table beneath the strip is hinged so as to be depressed upon the occurrence of the cutting operation. It is significant that the blade must yield a component of force in the direction of motion of the metal strip. This permits the shearing to be accomplished on a continuous basis as the hot metal is fed toward the rolling mill.

The elevating of lifting table 80 is lifted in a direction substantially parallel to the direction of motion for movable blade 28. Although a particular linkage has been disclosed for this purpose, the particular means used to lift the metal strip 10 toward the fixed blade 30 is not critical and a variety of equivalent lifting means may be employed.

While presently preferred embodiments of the invention have been illustrated and described, it will be recognized that the invention may be otherwise variously embodied and practiced within the scope of the claims which follow.

What is claimed is:

1. In a cutting system having a cutting station for cutting strip material, the combination comprising:
   (a) means to feed said strip material continuously along a line of travel toward a cutting station,
   (b) a fixed blade at said cutting station,
   (c) a movable blade at said cutting station adapted to move at an angle with respect to said strip material to provide a component of movement parallel to the strip material,
   (d) means to move said movable blade at an angle with respect to said line of travel,
   (e) and means to move said driven material in a direction vertically and forwardly with respect to said line of travel toward said fixed blade,
   (f) whereby said blade may cut said strip material as it is being fed continuously.

2. A metal cutting system as defined in claim 1 wherein said movable blade is moved along a path approximately 45° to said line of travel of said strip material and wherein said movable blade has a minimum linear velocity of approximately $\sqrt{2}$ times the velocity of said strip material whereby said component of movement parallel to said strip material is at least equal to the velocity of said strip material.

3. A metal cutting system as defined in claim 1 wherein:

(a) said fixed blade is an upper blade,
   (b) said movable blade is a lower blade whose movement is upwardly and forwardly with respect to said line of travel of said strip material.

4. A metal cutting system as defined in claim 3 including carriage means for carrying said movable blade and crank means for reciprocating said carriage means.

5. A metal cutting system as defined in claim 4 wherein said crank means includes a driven shaft, an eccentric rotatable with said shaft and a connecting rod slidably mounted on said eccentric.

6. A metal cutting system as defined in claim 5 including selectively energized clutch means connected to said driven shaft, and means to maintain said clutch means continuously energized whereby said strip material may be cut into relatively short lengths.

7. A metal cutting system as defined in claim 6 wherein said cutting station is positioned immediately in advance of a rolling mill, and wherein said fixed and movable blades define an exit chute whereby said relatively short lengths of strip material may fall from said line of travel when said clutch means is continuously energized whereby said relatively short lengths of said strip material will not pass into said rolling mill.

8. A metal cutting system as defined in claim 7 including feed means positioned immediately in advance of said cutting station actuated only when said clutch means is continuously energized to feed said strip material to said cutting station.

9. A metal cutting system as defined in claim 1 including carriage means for carrying said movable blade, and crank means for reciprocating said carriage means.

10. A metal cutting system as defined in claim 1 wherein said crank means includes a driven shaft, an eccentric rotatable with said shaft, and a connecting rod slidably mounted on said eccentric.

11. A metal cutting system as defined in claim 10 including selectively energized clutch means connected to said driven shaft, and means to maintain said clutch means continuously energized whereby said strip material may be cut into relatively short lengths.

12. A metal cutting system as defined in claim 11 wherein said cutting station is positioned immediately in advance of a rolling mill, and wherein said fixed and movable blades define an exit chute whereby said relatively short lengths of said strip material may fall from said line of travel when said clutch means is continuously energized whereby said relatively short lengths of said strip material will not pass into said rolling mill.

13. A metal cutting system as defined in claim 12 including feed means positioned immediately in advance of said cutting station actuated only when said clutch means is continuously energized to feed said strip material to said cutting station.

14. A method of cutting metal strip comprising the steps of:
   (a) continuously feeding said metal strip toward a cutting station,
   (b) supporting the undersurface of said metal strip along a line of travel,
   (c) moving said metal strip from said line of travel in a direction vertically and forwardly with respect to said line of travel,
   (d) cutting said metal strip between a pair of blades whose longitudinal axis is approximately 45° to a line perpendicular to said line of travel,
   (e) and moving said movable blade into cutting relationship when said metal strip has been moved from said line of travel and while said metal strip is being fed continuously toward said cutting station,
   (f) said blades being so arranged that one of them is fixed and the other is movable so as to have a component of motion forwardly with respect to said line of travel.

15. A method of cutting metal strip as defined in claim 14 including the additional steps of
(a) supporting the movable blade on a carriage,
(b) and reciprocating said carriage.

16. A method of cutting metal strip as defined in claim 15 wherein said step of moving said metal strip includes:
(a) inserting at least one elevating platform beneath said metal strip,
(b) and lifting said platform in synchronism with the forward advance of said movable blade.

17. A method of cutting metal strip as defined in claim 16 including the additional step of continuing the advance of said movable blade after said platform has been lifted to its maximum elevation.

18. A method of cutting metal strip as defined in claim 16 wherein said platform is lifted in a direction substantially parallel to the motion of said movable blade.

19. A method of cutting metal strip as defined in claim 14 including the additional step of imparting a V-shaped convex surface to the ends of said metal strip when cut by said pair of blades to facilitate entry of said metal strip into a rolling mill.

References Cited

UNITED STATES PATENTS

| | | | |
|---|---|---|---|
| 1,283,453 | 11/1918 | Barry | 72—330 |
| 2,002,486 | 5/1935 | Beford | 83—355 |
| 2,043,554 | 6/1936 | Potdevin | 83—262 X |
| 2,415,325 | 2/1947 | Wood | 83—284 X |
| 2,598,721 | 6/1952 | Porter | 83—262 |

F. T. YOST, Primary Examiner

U.S. Cl. X.R.

72—206; 83—37, 42, 262, 306, 355